INVENTORS
PETER L. MORAWETZ
MERYL W. TINKLENBERG
BY Strauss & Jacobson
ATTORNEYS March 14, 1972 P. L. MORAWETZ ET AL 3,649,509

ELECTRODEPOSITION SYSTEMS

Filed July 8, 1969 2 Sheets-Sheet 2

INVENTORS
PETER L. MORAWETZ
MERYL W. TINKLENBERG

BY [signature]
ATTORNEYS 3,649,509

ELECTRODEPOSITION SYSTEMS

Peter L. Morawetz, Minneapolis, and Meryl W. Tinklenberg, St. Paul, Minn., assignors to Buckbee-Mears Company, St. Paul, Minn.

Filed July 8, 1969, Ser. No. 839,918
Int. Cl. B01k *3/00;* C22d *1/02*
U.S. Cl. 204—238 10 Claims

ABSTRACT OF THE DISCLOSURE

A recirculating electrodepositing system having a plating cell with a pressurized plenum chamber for uniformly dispersing the plating solution onto the cathode and a set of sensors for continually determining the composition of the plating solution.

BACKGROUND OF THE INVENTION

Field of the invention

This invention relates generally to the art of electrodeposition of alloys and, more specifically, to means for controlling the composition of the deposition solution and means for controlling uniformity and thickness of the electrodeposited layer.

Description of the prior art

One of the problems associated with electrodeposition of certain alloys is that the various ingredients in the alloy tend to deposit out of the depositing or plating solution in disproportion to the percentage of the particular ingredients in the alloy. This produces an electrodeposited layer having a nonhomogeneous composition. In addition, it is difficult to electrodeposit to a controlled uniform depth because variations in the current density of the electroplating solution cause burning or pitting on the cathode. With electrodeposition of larger articles that only require an electrodeposited protective layer, these problems can be tolerated. However, these problems make it extremely difficult if not impossible to electrodeposit miniature articles such as magnetic strips. The present technology of electrodeposition makes it impossible to satisfactorily electrodeposit miniature magnetic strips which have a preferred orientation of the magnetic axis. Those miniature magnetic strips are used in computer memory devices and, typically, may be less than 1/1000 of an inch in width. With magnetic strips of this nature, it is apparent that a small variation of thickness in the magnetic material would produce a severe magnetostatic effect which will render the magnetic strip useless for use as part of a computer memory unit. Also, a variation in the composition of the plating solution could produce a magnetic material having localized areas that are substantially weaker than the rest of the magnetic strip thus producing a magnetic strip unsuitable for use in a computer memory unit.

In the electrodeposition of these magnetic strips, an operator uses a matrix suitable for simultaneously electrodepositing thousands of magnetic strips thereon. Therefore, it is necessary to carefully control the process of electrodeposition because if one unit is improperly deposited, it renders the entire unit inoperable.

DESCRIPTION OF THE PREFERRED EMBODIMENTS

Figure 1:
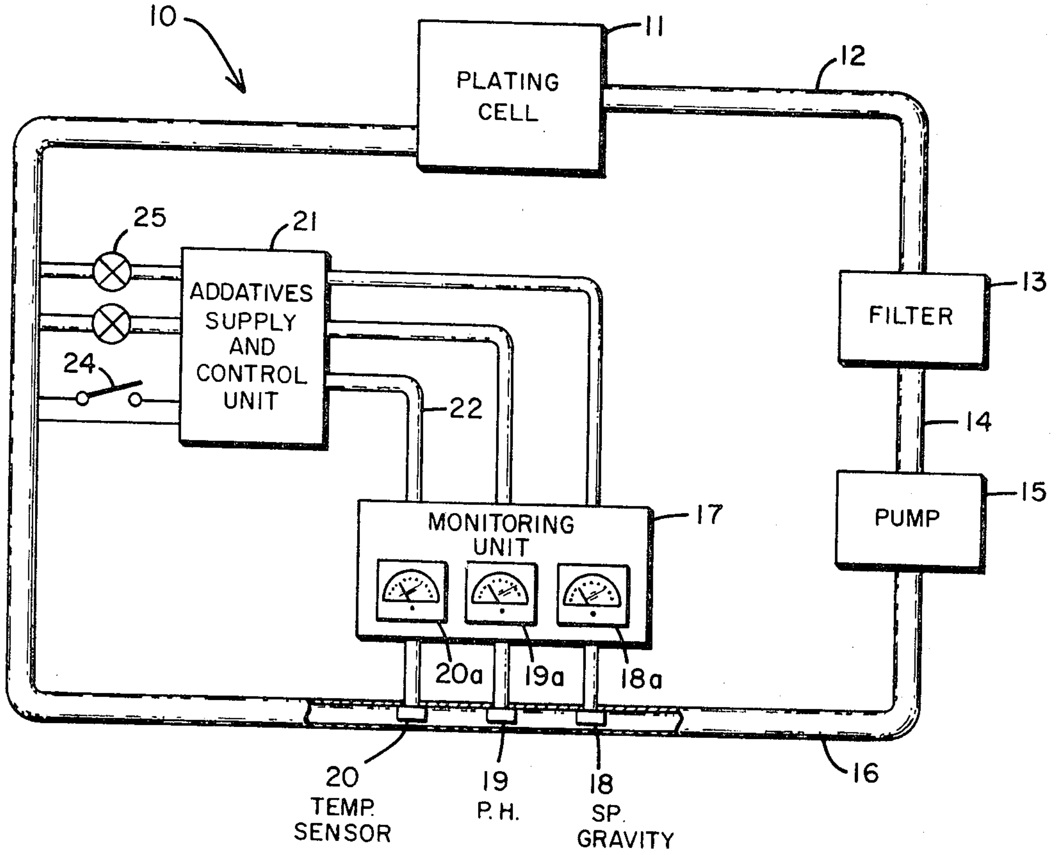
FIG. 1 shows the recirculating electrodeposition system partially in schematic form.

FIG. 1 shows a recirculating plating system 10 suitable for providing a plating solution of uniform composition to plating cell 11. The plating solution circulates through cell 11 and discharges from an overflow outlet through a conduit 12, a filter 13, a conduit 14, into a reservoir (not shown) where a pump 15 pumps the fluid back to the plating cell through a conduit 16. As the fluid is pumped through the conduit 16, the plating solution passes a number of sensors that measure the various states of the plating solution. For example, there is provided a specific gravity measuring unit 18 which can be a hydrometer, a pH measuring device 19 for determining the acidity or alkaline state of the solution and a temperature sensor 20 for determining the temperature of the plating solution. The sensing units are connected to a monitoring unit 17 having a set of meters 18*a*, 19*a* and 20*a* located therein. Meters 18*a*, 19*a* and 20*a* are conventional meters that respectively and visually indicate the specific gravity of the plating solution, the acidity or alkaline of the plating solution and the temperature of the plating solution. The meters can be by-passed and an electric signal can be applied to a control unit 21 through a set of conduits 22 to automatically vary the composition or the temperature of the plating solution to obtain the proper composition. However, if the unit is continuously attended by an operator, he monitors the meters to see that they are within the predetermined range and if a meter should indicate a parameter has exceeded a predetermined range, for example, if temperature should become too high, the operator can close a switch 24 which would activate a cooling coil (not shown) for cooling the plating solution. Similarly, if the composition of the plating solution exceeds a predetermined value, the operator can open a valve 25 that connects to a supply of additives which may typically be either nickel or iron. In this manner, the composition of the plating solution can be controlled so as to continuously produce the desired composition in plating cell 11.

Figure 2:
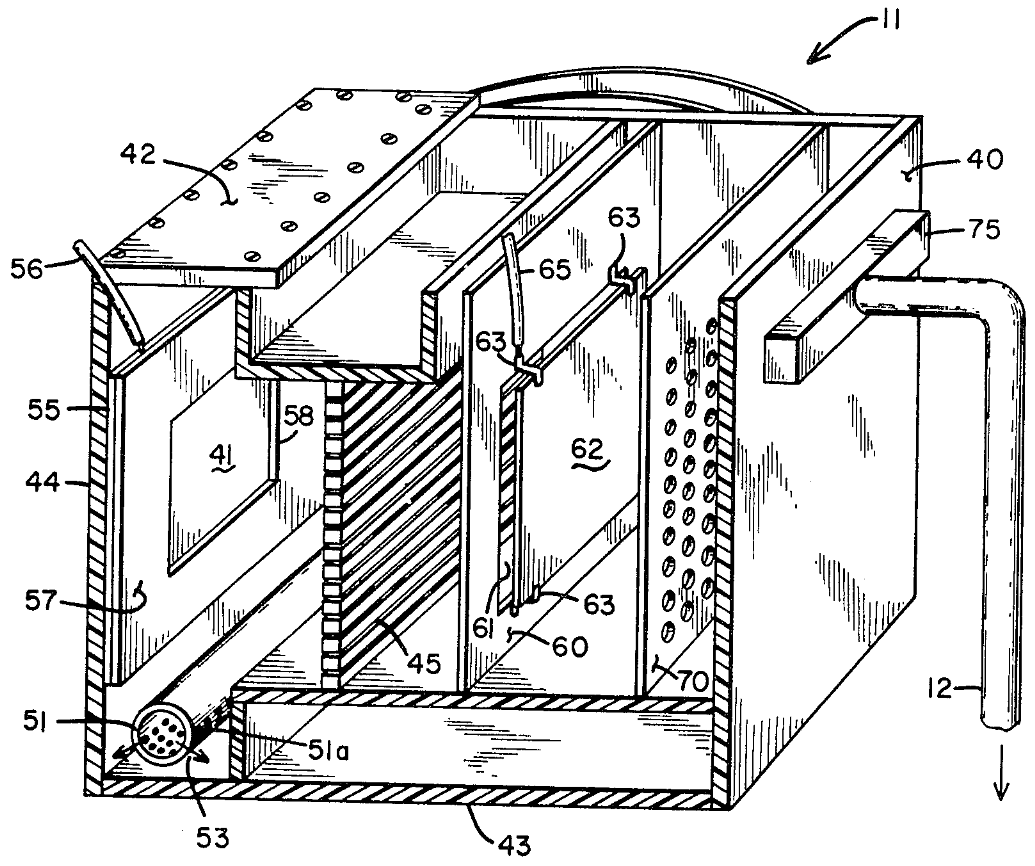
FIG. 2 shows an end view partially in section of the plating cell.

FIG. 2 shows an end view partly in section of a special plating cell 11 for use in electrodeposition of miniature magnetic strips. Plating cell 11 comprises a container 40 which is made from a suitable non-conducting material such as Plexiglas. Located at one end of container 40 is a closed inlet plenum chamber 41 which is bounded on the top by plexiglass cover 42, on the bottom by Plexiglas bottom plate 43 and on the ends by a pair of Plexiglas end plates (not shown) and on the front by Plexiglas member 44. These members define a substantially closed chamber that can be pressurized to force the solution through a louvered flow straightener outlet 45 located on the right side of plenum chamber 41. Flow straightener 45 produces a streamline flow pattern as the plating solution discharges from plenum chamber 41. Flow straightener 45 is also made from Plexiglas and comprises a plurality of parallel elongated strips that are located in a spaced relationship to produce a set of slits that, for example, may vary in height from approximately 0.17 inch to 0.24 inch, however no limitation is intended thereto.

Plenum chamber 41 receives the plating solution through an inlet (not shown) that connects to a cylindrical pipe 51 which is located in a recess 53 at the bottom of plenum chamber 41. Pipe 51 has a plurality of cylindrical fluid diffusing openings 51*a* located along the lower hemicircular portion of pipe 51. These openings direct fluid downward into recess 53 thereby preventing the plating solution from flowing directly from the inlet into flow straightener 45.

Located in plenum chamber 41 is an anode 55 having a conductive lead 56 thereon that is adaptable to be connected to a suitable source of electrical energy. Immediately adjacent anode 55 is a Plexiglas screening or masking unit 57 that has an opening 58 located therein. The purpose of the masking unit 57 is to allow an operator to readily mask off a preselected portion of anode 55 to accommodate the different size cathodes without changing the anode configuration.

Located in the open portion of container 41 is a Plexiglas cathode holder 60 having an opening 61 therein for receiving an article 62 which is to be plated. A set of conductive leads 63 are located on cathode holder 60 to hold article 62 in an upright position slightly spaced and parallel to the plane through cathode holder 60. Lead 63 connects to a conductor 65 which is adaptable to be connected to a suitable source of electrical energy.

Immediately downstream of cathode holder 60 is a distribution plate 70 that has a set of graded openings 71 whose diameter increases toward the bottom of the plating cell. The purpose of distribution plate 70 is to ensure that the plating solution does not become stagnate behind cathode holder 61 and also to ensure that the plating solution flows evenly past cathode 62.

Connected to the outside of container 40 is an overflow discharge 75 that allows the plating solution to discharge through conduit 12.

Figure 3:
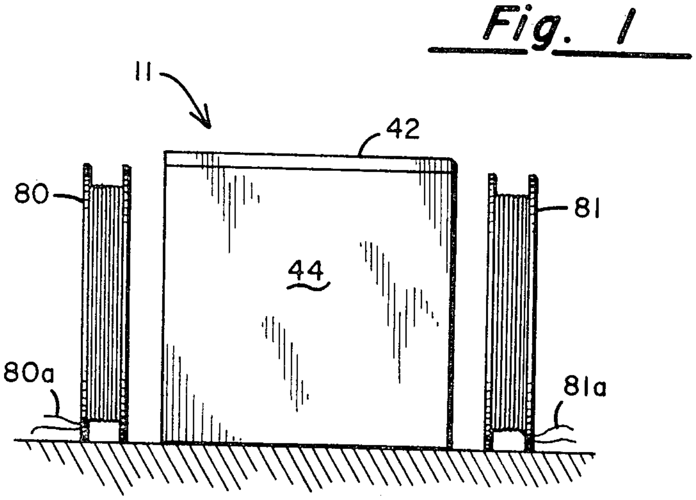
FIG. 3 shows a front view of the plating cell and the coils for providing a magnetic a magnetic field within the plating cell.

FIG. 3 shows a front view of plating cell 11 with a first coil of wire 80 located on one side of plating cell 11 and a second coil of wire 81 located on the opposite side of container 11. Coil 80 has a pair of electrical leads **80*a* and coil 81 has a pair of electrical leads 81*a* that are adaptable to be connectable to a suitable DC source of electrical energy so as to produce a uniform magnetic field in cell 11. In order to ensure the field is uniform in the plating region the centers of coil 80 and 81 are aligned so that a plane passing substantially through the article to be plated will also pass through the center of coils 80 and 81**. This is the preferred orientation of the coils as it ensures a uniform magnetic field throughout the region being plated.

In a typical operation of electrodepositing miniature magnetic strips, it may be desired to electrodeposit a magnetic material such as permalloy which comprises 80% nickel and 20% iron onto a suitable matrix which forms cathode 62. It is desirable to use a magnetic material such as permalloy as it has very good permanent magnetic properties for use in articles such as digit lines that are used in computer memory units. In order to ensure that the magnetic material is electrodeposited with preferred orientation of the magnetic axis, it is necessary to electrodeposit the magnetic substance on matrix 62 in a magnetic field. Also, by controlling the composition of the plating solution and producing a streamline continuous flow of plating solution through plating cell 11 ensures that the material deposits homogeneously and evenly on the cathode.

In operation, the plating solution enters plating cell 11 through openings **51*a* in pipe 51. These openings direct the solution downward in the plenum chamber thus causing the solution to follow a circuitous path in plenum chamber 41 before being discharged under pressure from plenum chamber 41 through flow straightener 45. By having the solution follow a circuitous path in plenum chamber 41 it mixes the solution thus preventing the solution from becoming stagnant in localized areas. The solution discharging from flow straightener 45 issues in the form of parallel sheets or jets of solution that entrains adjacent fluid particle thus effectively and continuously moving the solution past matrix 62. As the solution passes around and impinges on cathode or matrix 62 the magnetic substance deposits onto the matrix. After the solution flows past matrix or cathode 62 it discharges through graded distribution plate 70 and into overflow outlet 75. The openings in the bottom of distributor plate 70 are larger than the openings in the top of distributor plate 70 to offer less resistance to fluid passing therethrough. This prevents the solution from being skimmed off the top as the solution flowing along the bottom of container 40 will have approximately the same resistance to discharging out overflow 75 as the solution on the top of container 41** which flows the more direct route but through smaller holes having a higher resistance to fluid flow therethrough.

As the particles flow through container 40, they are acted upon by the magnetic field produced by coils 80 and 81. Typically, coils 80 and 81 could be of the Helmholtz variety where the coils are of equal diameter and have an equal number of turns as well as having the distance between the two coils equal to the diameter of the coils. The Helmholtz coils are preferred because they produce a relatively uniform magnetic field which aids in uniformly electrodepositing the alloy with a preferred magnetic axis.

We claim:

1. An apparatus for electrodeposition of an alloy comprising: a container for continuously receiving and discharging an electrodepositing solution, said container having an inlet plenum chamber for receiving the solution; an anode located in said plenum chamber, said anode adapted to be connected to a source of electrical energy; a flow straightening outlet formed of closely spaced parallel elongated strips for discharging the solution in a streamline flow from said plenum chamber; a cathode for receiving the solution in an impinging relationship, said cathode adapted to be connected to a source of electrical energy; and a flow distribution plate having a plurality of graded openings sized progressively larger as a function of their greater distance from the solution outlet passageway for uniformly discharging solution from said container.

2. The apparatus as described in claim 1 including means for circulating the solution.

3. The apparatus as described in claim 1 including a pair of coils adapted to be connected to a source of electrical energy to thereby produce a uniform magnetic field in said plating solution.

4. The apparatus as described in claim 3 wherein said pair of coils has a geometrical center that is substantially in line with a plane through said cathode.

5. The apparatus as described in claim 4 including inlet means for dispersing the plating solution uniformly into the plenum chamber.

6. The apparatus as described in claim 5 including a symmetrical flow chamber to produce a uniform flow distribution through the plating solution.

7. The apparatus as described in claim 6 including the filter unit for removing extraneous material from the plating solution.

8. The apparatus as described in claim 7 including means for determining whether the plating solution is at its proper temperature.

9. The apparatus as described in claim 7 including means for determining whether the specific gravity for the plating solution is within a predetermined range.

10. The apparatus as described in claim 7 including means for determining whether the pH of the solution is within a predetermined range.

References Cited

UNITED STATES PATENTS

| | | | |
|---|---|---|---|
| 1,416,929 | 5/1922 | Bailey | 204—237 X |
| 2,260,893 | 10/1941 | Ewing | 204—237 X |
| 3,317,410 | 5/1967 | Croll et al. | 204—239 X |
| 3,415,732 | 10/1968 | Komjathy | 204—237 |
| 3,480,522 | 11/1969 | Brownlow | 204—273 X |

JOHN H. MACK, Primary Examiner

D. R. VALENTINE, Assistant Examiner

U.S. Cl. X.R.

204—275, 276